Figure 1:
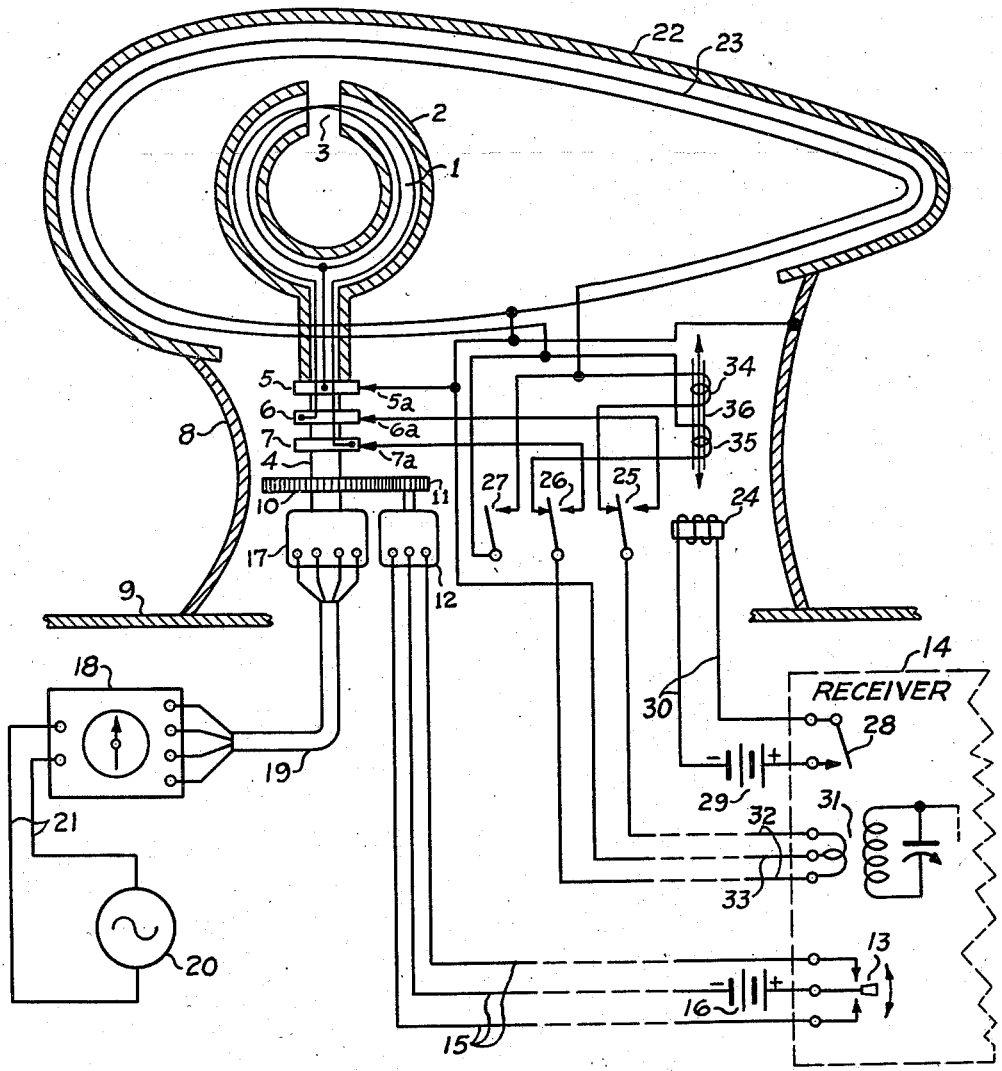

Feb. 12, 1946. P. H. KREAGER 2,394,787
DIRECTIONAL ANTENNA SYSTEM
Filed Dec. 12, 1941 2 Sheets-Sheet 2

INVENTOR.
PAUL H. KREAGER
BY Joseph Q. Stansfield
ATTORNEY.

Patented Feb. 12, 1946

2,394,787

UNITED STATES PATENT OFFICE 2,394,787

DIRECTIONAL ANTENNA SYSTEM

Paul H. Kreager, Towson, Md., assignor to Bendix Aviation Corporation, South Bend, Ind., a corporation of Delaware Application December 12, 1941, Serial No. 422,627

4 Claims. (Cl. 250—11)

This invention relates to directional antennas and more particularly to a directional antenna selectively serving the dual functions of quadrantal error corrector and emergency antenna.

In the installation of radio direction finding equipment in aircraft, the location of the externally mounted loop is selected for best reception efficiency and minimum head resistance, while the operating controls of the direction finding equipment are situated in a position affording maximum convenience for the operator. To accommodate varying installation requirements, remote control of the loop rotation and bearing indication are generally accomplished in some manner permitting the use of flexible connections for the transfer of power. Two commonly used systems are a mechanical one employing flexible shafting, and an electrical one employing an electric loop drive motor and a self-synchronous electric bearing transmitter at the loop.

An important deficiency of remote control and indication systems is that a failure in the system for remotely indicating the loop position with respect to the longitudinal axis of the ship leaves the operator with no means of obtaining radio bearings, as he is without definite knowledge of the position of the direction finding loop.

In the use of radio direction finding equipment, it has been found that the apparent bearing of a transmitter and its true bearing often differ widely, depending on the position of the ship with respect to the direction of arrival of the electromagnetic energy. Because of the form of the curve of this error as plotted against the true bearing, it is usually termed quadrantal error. The present domestic procedure is to correct bearings either by consulting a table of corrections for use with the particular ship, or to accomplish the same result by incorporating a mechanical compensator in the apparatus for repeating the loop bearings at the control point. Because of the speed with which events happen in aircraft navigation, the popularity of the correction table is rapidly dwindling and it is being superseded by the latter method. The accuracy obtainable with the mechanical compensator is dependent on the range of corrections to be accommodated. Bearing errors of the order of 25 degrees are frequently encountered in all-metal aircraft, thus a total range of adjustment of at least 50 degrees is required in the compensator. Reduction in the range of corrections to be applied by the mechanical compensator, which is accomplished as a part of my invention, results in materially increased accuracy of the corrected bearings delivered to the operator.

One of the principal objects of my invention is to provide radio direction finding equipment having an increased factor of safety and greater bearing accuracy.

Another object of my invention is to provide combined means for the reduction of quadrantal error and for emergency direction finding.

Figure 2:
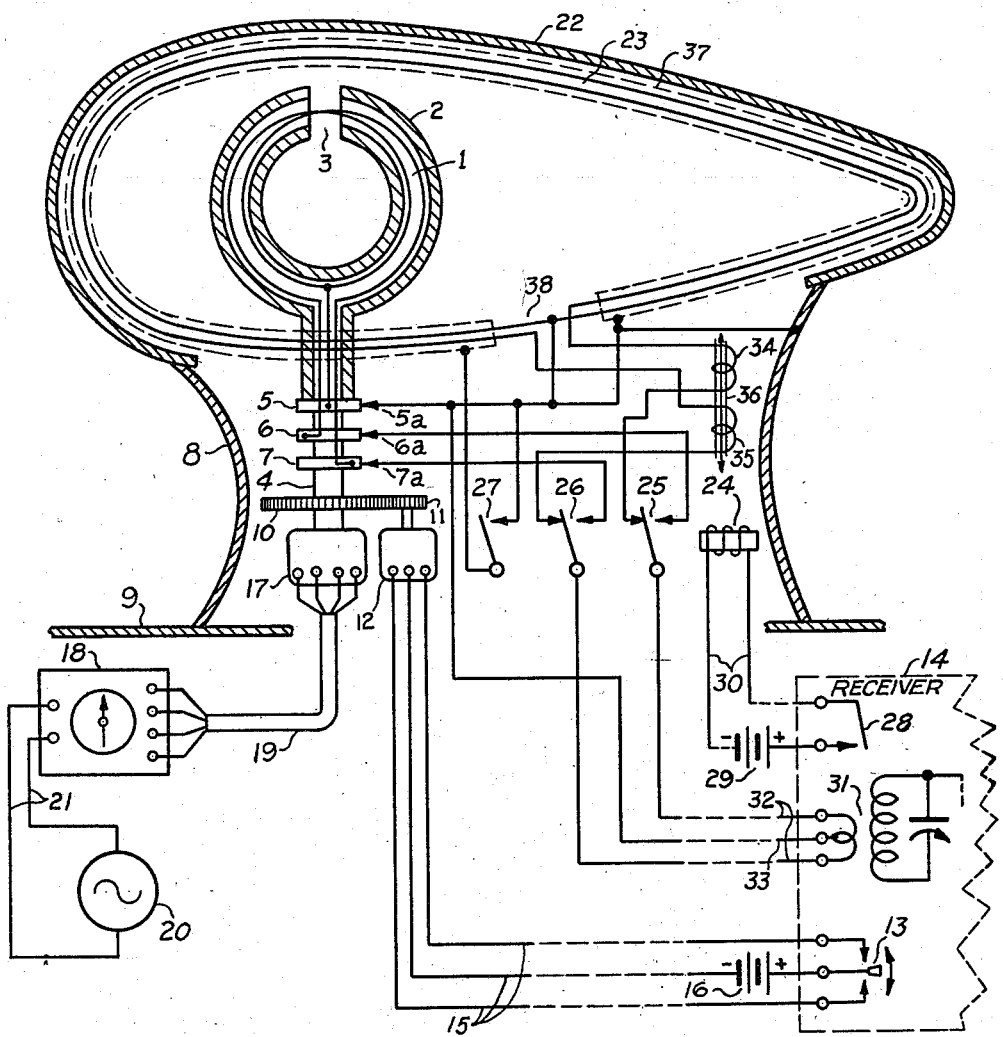

Other objects and advantages will in part be disclosed and in part be obvious when the following specification is read in conjunction with the drawings in which:

Figure 1 is a schematic diagram showing one embodiment of the invention, and Figure 2 is a schematic diagram showing an alternative form of the invention.

It is to be understood that these drawings are intended to illustrate a preferred form of the invention, and are not to comprise a limitation in the content or scope of the invention.

In the drawings, like parts are designated by like reference characters.

Referring now in greater detail to Figure 1, the center-tapped loop winding 1 is located within the metallic shield 2 having the insulated gap 3. This assembly is securely fitted to the shaft 4, which is made of insulating material and together they constitute what is generally known as an electro-statically shielded loop. The slip ring 5 is directly connected to the center tap of the loop 1 and to the shield 2. A ground connection from the slip ring 5 to the base 8 is established through the brush 5a. All the loop drive, bearing transmission and circuit switching equipment is located within this base 8 which is mounted on the aircraft "skin" 9. The lower slip rings 6, 7 are mechanically attached to the shaft 4 and they are electrically connected respectively to the two ends of the loop winding 1. Affixed to the shaft 4 is the loop drive gear 10, which is engaged by the drive pinion 11 of the reversible electric motor 12. This motor 12 is connected to the reversing switch 13 in the receiver 14 by the conducting leads 15 containing the battery 16 as a source of power for the motor. Actuation of the reversing switch 13 causes the loop assembly to be driven in the desired direction. As the switch 13 is released, the center member returns to the neutral position, breaking all power supply circuits to the driving motor 12, stopping the loop at the chosen position.

The self-synchronous bearing transmitter 17, which may be of the type known to the trade as an "Autosyn," is controlled by an extension of the shaft 4. The bearing transmitter 17 is connected to the remotely located bearing indicator 18 of the same type by the connecting cable 19. Power for the system is derived from the alternator 20 through the conductors 21.

Mounted on the base 8, and enclosing the rotatable loop assembly there is shown the streamlined housing 22, whose main function is the reduction of the head resistance of the completed assembly. This housing is preferably constructed of some suitable dielectric material.

All of the above parts are already known in combination, and together they form a well known type of remotely controlled, remote indicating, streamlined radio direction finding loop.

To the interior periphery of housing 22 is secured, by adhesive or other suitable means, a fixed loop winding 23 which may, depending on the shape of correction curve desired, lie in a plane including the axis of rotation of the assembly including loop winding 1. The fixed loop winding 23 may also be center tapped as shown, with the center tap grounded to the base 8.

In the base 8 there is additionally located the relay 24 having contact assemblies 25, 26, 27. The operating winding of this relay is serially connected with the switch 28 and the battery 29 by the leads 30. The relay 24 is shown in the de-energized position. The armatures 25, 26, are connected to the input circuit 31 of the receiver 14 by the connecting wires 32. The center tap of the input circuit 31 is connected to the center tap of the rotatable loop winding 1, to the center tap of the fixed loop winding 23, and to the base 8 by the conductor 33, which may lie in the same cable with the connecting wires 32.

With the relay 24 in the energized position, the rotatable loop winding 1 is connected to the receiver input circuit 31 through the front contacts 25, 26 of relay 24 and the brushes 6a, 7a, engaging the slip rings 6 and 7, while at the same time the contacts 27 short-circuit the fixed loop winding 23. In the de-energized position of relay 24, the rotatable loop winding is disconnected from the receiver input circuit and the short circuit is removed from the fixed loop winding 23. The fixed loop winding 23 is now connected to the receiver input circuit 34 through the back contacts 25, 26 of relay 24 and the adjustable trimming inductances 34, 35 which are set to the desired value by means of the movable iron core 36.

In operating under normal conditions the switch 28 is closed, thereby operating relay 24 and connecting the rotatable loop winding 1 to the receiver 14 in the normal manner. At the same time the fixed loop winding 23 is short-circuited and thus serves as a correcting loop introducing quadrantal error of such sign and magnitude as to reduce the overall quadrantal error of the complete installation on the aircraft. The loop may be rotated to a null position by operation of the switch 13 and the bearings read on the bearing indicator 18 in taking a radio fix. However, should a failure occur in the bearing indicating circuits, such as the burnout of alternator 20 or a break in the connecting cables, the operator will be without knowledge of the angular position of the rotatable loop, and consequently cannot take radio bearings.

In an installation incorporating my invention, it is merely necessary that the operator open the switch 28, de-energizing relay 24 and connecting the fixed loop circuit to the input circuit 31 of the receiver 14. The fixed loop is now no longer a correcting loop, but serves as an emergency loop whose position with reference to the longitudinal axis of the ship is known. Radio bearings may now be taken by the operator through the simple expedient of swinging the aircraft to the position of null reception and recording the magnetic heading of the ship with the necessary correcting angle.

In Figure 2 there is shown an alternative form of the invention in which provision has been made for the reduction of "vertical" pick-up in the fixed loop winding 23 and for improved emergency loop reception during periods of precipitation static. A further advantage of this modification lies in the fact that any number of turns may be employed in the fixed loop winding 23 without affecting the operating efficiency of the correcting loop. The modification lies in the inclusion of the metallic shielding 37 placed around the fixed loop winding 23. The shielding is not continuous, but is provided with the non-conducting gap 38. Connecting leads are attached to the shielding at each side of the gap 38 and brought down to the short circuiting contacts 27 on relay 24. With this arrangement and the relay 24 in the energized position, the shield, rather than the fixed loop winding 23 itself, is shirt-circuited and thereby acts as the correcting loop. Metallic shielding 37 is preferably of a type easily formed to fit the interior of the housing 22 such as, for example, the widely used tinned copper loom. The shield may be grounded to the base 8 by a lead as shown.

The trimming inductances 34, 35 shown in Figure 1 are included to permit adjustment of the electrical characteristics of the fixed loop circuit to present the same loading to the input circuit of the receiver as the rotatable loop winding. Suitable design of the fixed loop winding will permit the elimination of these inductances, but their retention may prove desirable to permit correction of the normal inductance variations occurring during manufacture.

It is well known that the form of the quadrantal error curve depends on the circumstances of an installation; the quadrantal error curves of large steamships differing radically from those of aircraft. While I have shown the fixed loop designed for mounting along the fore and aft axis of a craft, it is neither my intention nor desire to confine myself to this arrangement, for the fixed loop may have any conceivable orientation with respect to the zero degree azimuth position of the rotatable loop, depending on the shape of the correction curve desired. In installations where the housing 22 is not desired, the fixed loop winding and its shield may be made self-supporting. In securing the necessary operating characteristics, it may be possible to use a distributed winding for the fixed loop, or even to employ a number of interconnected plane winding sections to fulfill its functions.

It will be evident that many changes and modifications may be made in the invention without departing from the spirit thereof as expressed in the foregoing description and in the appended claims.

What I claim is:

1. The combination of a radio receiver, a directional antenna rotatably mounted on a body, a loop antenna fixed with respect to said body and located within an electrostatic shielding structure having an insulated gap, said shielding structure being so disposed as to alter the apparent direction of arrival of electromagnetic energy at said directional antenna when said insulated gap is short circuited, means for selectively short circuiting said insulated gap, and switching means for alternatively connecting said directional antenna or said fixed loop to the input circuit of said radio receiver.

2. The combination of a radio receiver, a directional antenna rotatably mounted on a body, a loop antenna fixed with respect to said body and located within an electro-static shielding structure having an insulated gap, said shielding structure being so disposed as to alter the apparent direction of arrival of electromagnetic energy at said directional antenna when said insulated gap is short circuited, means for selectively short circuiting said insulated gap, switching means for alternatively connecting said directional antenna or said fixed loop to the input circuit of said radio receiver, and means for adjusting the electrical characteristics of the fixed loop circuit to match those of said directional antenna.

3. The combination of a radio receiver, a directional antenna rotatably mounted on a body, a loop antenna fixed with respect to said body and located within an electrostatic shielding structure having an insulated gap, said shielding structure being so disposed as to alter the apparent direction of arrival of electromagnetic energy at said directional antenna when said insulated gap is short circuited, and electromagnetically operated switching means for selectively short circuiting said insulated gap and for alternatively connecting said directional antenna or said fixed loop to the input circuit of said radio receiver.

4. The combination of a radio receiver, a directional antenna rotatably mounted on a body, a loop antenna fixed with respect to said body and located within an electrostatic shielding structure having an insulated gap, said shielding structure being so disposed as to alter the apparent direction of arrival of electromagnetic energy at said directional antenna when said insulated gap is short circuited, and electromagnetically operated switching means for selectively short circuiting said insulated gap and for alternatively connecting said directional antenna or said fixed loop to the input circuit of said radio receiver, said gap being short circuited when said directional antenna is connected to the input circuit of said radio receiver, the short circuit being removed when said fixed loop is connected to the input circuit of said radio receiver.

PAUL H. KREAGER.